United States Patent
Molter et al.

(10) Patent No.: US 10,686,587 B2
(45) Date of Patent: Jun. 16, 2020

(54) METHOD FOR SAFEGUARDING THE INFORMATION SECURITY OF DATA TRANSMITTED VIA A DATA BUS AND DATA BUS SYSTEM

(71) Applicant: Continental Teves AG & Co. oHG

(72) Inventors: Hans Gregor Molter, Darmstadt (DE); Marc Stoettinger, Oestrich-Winkel (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 171 days.

(21) Appl. No.: 15/576,940

(22) PCT Filed: May 19, 2016

(86) PCT No.: PCT/EP2016/061295
§ 371 (c)(1),
(2) Date: Nov. 27, 2017

(87) PCT Pub. No.: WO2016/188859
PCT Pub. Date: Dec. 1, 2016

(65) Prior Publication Data
US 2018/0159681 A1 Jun. 7, 2018

(30) Foreign Application Priority Data
May 27, 2015 (DE) ........................ 10 2015 209 709

(51) Int. Cl.
*H04L 9/06* (2006.01)
*H04L 9/32* (2006.01)
*H04L 29/06* (2006.01)

(52) U.S. Cl.
CPC .......... *H04L 9/0631* (2013.01); *H04L 9/0637* (2013.01); *H04L 9/0643* (2013.01);
(Continued)

(58) Field of Classification Search
CPC ................................................... H04L 9/0631
See application file for complete search history.

(56) References Cited

U.S. PATENT DOCUMENTS

| 2004/0252836 | A1 | 12/2004 | Yoshida et al. |
| 2011/0040977 | A1* | 2/2011 | Farrugia ............... H04L 9/0662 713/181 |

(Continued)

FOREIGN PATENT DOCUMENTS

| CN | 102402488 A | 4/2012 |
| CN | 103929301 A | 7/2014 |

(Continued)

OTHER PUBLICATIONS

International Search Report and Written Opinion dated Aug. 22, 2016 from corresponding International patent application PCT/EP2016/061295.

(Continued)

*Primary Examiner* — Bradley W Holder

(57) ABSTRACT

A method for saving the information security of data transmitted by a databus, in which the data to be transmitted via the databus from a transmitter ($ECU_s$) to at least one receiver ($ECU_R$) are divided into data blocks ($M_0 \ldots M_n$) before being sent off, wherein the data blocks ($M_0 \ldots M_n$) are encrypted and/or signed block by block by means of a sponge construction for forming a cryptological hash function, utilizing a key, and cipher blocks ($C_0 \ldots C_n$) generated in this way are transmitted via the databus to the at least one receiver. The invention also relates to a corresponding databus system.

19 Claims, 2 Drawing Sheets

Figure 1:
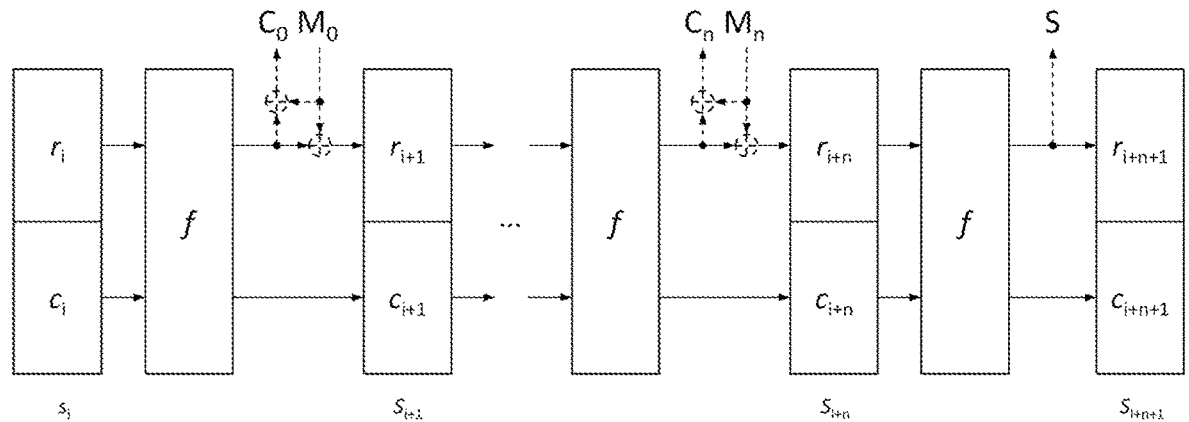

(52) U.S. Cl.
CPC .......... *H04L 9/3239* (2013.01); *H04L 9/3242* (2013.01); *H04L 9/3247* (2013.01); *H04L 63/0442* (2013.01); *H04L 63/061* (2013.01)

(56) References Cited

U.S. PATENT DOCUMENTS

| | | | | |
|---|---|---|---|---|
| 2012/0284533 | A1* | 11/2012 | Assche | H04L 9/06 713/192 |
| 2013/0325820 | A1* | 12/2013 | Grube | G06F 11/0727 707/691 |
| 2014/0195875 | A1* | 7/2014 | Resch | G06F 11/1092 714/763 |
| 2014/0244788 | A1* | 8/2014 | Resch | H04L 67/1097 709/217 |
| 2015/0199175 | A1* | 7/2015 | Wang | G06F 7/58 708/250 |
| 2015/0244685 | A1* | 8/2015 | Shah | G06F 21/602 713/155 |
| 2016/0020901 | A1* | 1/2016 | Kurdziel | H04L 9/0838 380/28 |
| 2016/0224422 | A1* | 8/2016 | Resch | G06F 11/1076 |
| 2016/0294949 | A1* | 10/2016 | Motwani | H04L 67/1097 |
| 2018/0107423 | A1* | 4/2018 | Kaczmarek | G06F 3/0619 |
| 2018/0316569 | A1* | 11/2018 | Cilfone | H04L 43/0817 |

FOREIGN PATENT DOCUMENTS

| | | |
|---|---|---|
| WO | 2006086554 A2 | 8/2006 |
| WO | 2011120573 A1 | 10/2011 |
| WO | 2012154129 A1 | 11/2012 |

OTHER PUBLICATIONS

DE search report dated Jan. 26, 2016 of corresponding German patent application No. 10 2015 209 709.9.

JH. Song, R. Poovendran; University of Washington, J. Lee; Samsung Electronics, T. Iwata, Nagoya University; 5. JCT-VC Meeting; Mar. 16, 2011-Mar. 23, 2011; Geneva; (Joint Collaborativ Team on video coding of ISO/IEC JTC1/SC29/WG11 and I TU-T SG.16); URL: http://wftp3.itu.int/av-arch/jctvc-site/Internet Engineering Task Force, IETF, CH, Jun. 1, 2006 (Jun. 1, 2006), XP015054998, ISSN: 0000-0003 the whole document.

Joan Daemen et al. "Permutation-based, authentication and authenticated encryption", DIAC—Directions in Authenticated Ciphers 2012, Jul. 5, 2012, XP55213223, Stockholm Sweden, http://hyperelliptic.org/DIAC/slides/PermutationDIAC2012.pdf [retrieved on Sep. 14, 2015].

* cited by examiner

METHOD FOR SAFEGUARDING THE INFORMATION SECURITY OF DATA TRANSMITTED VIA A DATA BUS AND DATA BUS SYSTEM

The invention relates to a method for saving the information security of data transmitted by a databus according to the preamble of claim 1, and a corresponding databus system.

To preserve the confidentiality of messages, these are encrypted by means of cryptographic methods in a manner known per se. The resultant key text can then not be read by a third party with simple means. Conventional industrial methods exist in the field of symmetrical cryptography—transmitter and receiver use the same secret key—for example AES (Advanced Encryption Standard) and in the field of asymmetric cryptography—transmitter and receiver in each case have unequal pairs of keys consisting of private and public key—for example RSA (Rivest, Shamir and Adleman). For these methods, various protocol layers exist which are used for encrypting and/or also for ensuring the authenticity. The disadvantage of these methods is that, as a rule, only large data packets can be processed efficiently and/or that input data have to be encrypted and signed in two separate part-steps, the latter having to ensure the authenticity.

It is the object of the present invention, therefore, to provide a method by means of which the communication over a databus can be implemented confidentially (not legible for an attacker) and authentically (transmitter of the data is known).

This object is achieved by the method according to the invention according to claim 1 and the databus system according to the invention according to claim 14.

The invention describes a method for saving the information security of data transmitted by a databus in which data to be transmitted via the databus from a transmitter to at least one receiver are divided into data blocks before being sent off and the data blocks are encrypted and/or signed block by block by means of a sponge construction for forming a cryptological hash function, utilizing a key, and cipher blocks generated in this way are transmitted via the databus to the at least one receiver.

Sponge constructions represent a class of cryptological hash functions which can produce from an incoming bitstream of any length an outgoing bitstream of any length and wherein sponge constructions have in this context a plurality of internal states which comprise in each case at least two parts: a so-called rate and a so-called capacity. A state is mapped unto a subsequent state, accommodating a data block, by means of a sponge function comprising the sponge constructions. Processing of all data blocks performed in this way is frequently called absorption phase of the sponge construction or of the sponge, and a phase in which the output occurs is frequently called discharge phase. If there is alternate absorption and discharge, it is called a duplex sponge construction. The key is preferably secret in this context, i.e. essentially only known to the transmitter and to the at least one receiver. The block length of the data blocks and the key length of the key preferably represent predeterminable parameters of the respective implementation. The bus system is a system for data transmission between a number of users which supports a 1-to-N communication (one transmitter and a plurality of receivers). In this context, each user can frequently occur as transmitter and as receiver in the communication. Examples of this type of bus systems in the automobile field are CAN bus or BroadR-Reach.

By means of the invention, the information security can be saved advantageously, especially of comparatively small data packets, by means of which the communication via a databus can be implemented confidentially and authentically. Furthermore, the method according to the invention can be carried out more efficiently than, for example, the known AES-CMAC method since there are fewer AES operations in the solution presented here, compared with the AES-CMAC method. The AES-CMAC method would need $2n+3$ AES operations for an encryption and signing of n data blocks whereas the method according to the invention advantageously needs only $2n+2$ AES operations.

In consequence of an advantageous embodiment of the invention, the block-by-block encryption of the data blocks and block-by-block generation of the cipher blocks takes place during a phase of the inclusion of the data blocks. A cipher block is then generated advantageously immediately during and with inclusion of a respective data block. Individual encrypted data blocks or cipher blocks are thus already available for further processing before conclusion of the entire encryption.

Following the encryption of data blocks and generation of the cipher blocks, a signature is preferably generated by means of the sponge construction on the basis of the data blocks to be transmitted and of the key and transmitted via the databus. By means of the signature, the originator and integrity of the data blocks transmitted can be checked by the receiver or receivers. In addition, the encryption of the data and the generation of the associated signature can take place in one common pass.

Preferably an internal starting or initialization state of the sponge construction is initialized with the key. An initialization of the initialization state usually occurs with zero and the key is subsequently included by means of Exclusive OR logic. Due to the direct initialization of the initialization state with the key, an improved computing power is achieved and resources are saved.

In accordance with a preferred development of the invention, an internal state of the sponge construction has a rate and a capacity, a content of a cipher block being utilized for a rate of a respectively following internal state of the sponge construction. Advantageously, the secret key itself and/or the respective cipher block form the basis for further encryption of subsequent data blocks. This ensures that data blocks of identical content do not result in a formation of cipher blocks of identical content. This prevents so-called "known ciphertext" attacks in which known cipher blocks are applied to an unknown datastream in order to gain knowledge about the original data blocks. Furthermore, this procedure prevents "replay" attacks in which cipher blocks previously recorded are played into the communication datastream again. By utilizing the internally changing secret state, no additional counter values or time-based data need to be sent over the bus in order to validate the currency of the cipher blocks at the receiver end. Due to the identical internal state of transmitter and receiver, the sponge construction provides for implicit synchronization as a result of which no explicit synchronization is needed in this signature method which, in particular, is of advantage for saving the information security of data transmitted via a databus. Due to this synchronization mechanism which utilizes the incoming and outgoing message, the number of data sent via the bus is reduced and thus better bus loading is achieved.

A cipher block is preferably determined from a rate of an internal state, using a data block. The rate represents a part of the key in the case of the first internal state or initialization state, respectively, and, in the case of a following internal state, a rate calculated by means of at least one sponge function comprised by the sponge construction.

In this way, the advantage is achieved, among other things, that the key and/or the internal state already permutated and/or transformed by means of the sponge function are utilized for the encryption of a respective data block.

True to a development of the invention, a cipher block is determined by utilizing a data block from a rate obtained from the key or a rate calculated by means of a sponge function, by means of Exclusive-OR logic.

The sponge construction suitably has at least one sponge function which maps an internal state onto a following internal state, the sponge function being formed by using at least one substitution permutation network. By this means, an improved utilization of resources can be provided for on the basis of the possible parallelization and an avoidance of the reversibility of the encryption.

The substitution permutation network is preferably implemented by means of a block cipher. In particular, the block cipher is a block encryption and/or a block decryption. An advantage of this is that both for the encryption and also the decryption of a data block, only the encryption function of the internally utilized block cipher is needed. As a result, less program memory is necessary in the implementation and the expenditure for the quality assurance in the case of a source code check is reduced. Preferably, the block encryption is based on the Advanced Encryption Standard. The Advanced Encryption Standard represents a standard which is currently considered to be virtually secure and is allowed to be implemented without restriction.

A first part of an internal state of the sponge function is supplied as data to be encrypted and a second part of the internal state of the sponge function is supplied as key.

The second part of an internal state of the sponge construction is preferably supplied to a further substitution permutation network of the sponge function as data to be encrypted and the first part of the internal state is supplied to the substitution permutation network as key.

The sponge function preferably maps an internal state onto a following internal state, at least one data block being additionally included by means of an Exclusive-OR logic combination. Furthermore, at least one cipher block is generated by utilizing at least one data block preferably during a transition from an internal state to a following internal state.

According to a development of the invention, the transmission of the cipher blocks via the databus occurs preferably following the encryption of all data blocks and formation of the signature or block-by-block in each case following the encryption of an individual data block. The signature S can be created jointly for these several messages or data blocks in the case of several messages or data blocks to be transmitted. In accordance with the second embodiment, an on-the-fly encryption and immediately following transmission of the respective encrypted data is achieved, wherein preferably the signature can also be generated and transmitted thereafter. This procedure provides for an efficient sequential decryption of the encrypted and transmitted data by the receiver or receivers, by which means shorter latency times can be achieved.

The length of a data block suitably corresponds to the length of a data frame or to the length of the payload data of a data frame of a basic databus protocol of the databus or the length of a data frame of a databus protocol of the databus corresponds to a multiple of the length of a data block. For example, in the case of a CAN message, the latter in its entirety, or the payload data field thereof, can thus form a separate data block which is encrypted. Instead of the unencrypted CAN messages, the encrypted cipher blocks are transmitted in this manner by means of CAN bus.

The invention also relates to a databus system comprising a transmitter, at least one receiver and at least one communication means for communication between the transmitter and the at least one receiver, the databus system being designed in such a manner that it can carry out the method according to the invention. A cryptographic databus system executing the method according to the invention can advantageously not be attacked successfully with conventional side channel attacks such as, for example, computing time attack or analysis of the power consumption since due to the continuous updating process of the capacity and the rate of the internal state which are then used as keys for the encryption, a new key is used for each encryption undertaken. For an analysis, it would have to be attempted with one side channel measurement per encryption process to determine the current value of the internal state. To apply significant statistical evaluations to the internal state, however, several side channel measurements are needed. Due to the different keys for each encryption process, such an analysis cannot be performed successfully. The block encryption, therefore, preferably has a constant and value-independent run time.

Further preferred embodiments are obtained from the subclaims and the subsequent description of illustrative embodiments, by means of figures.

Figure 2:
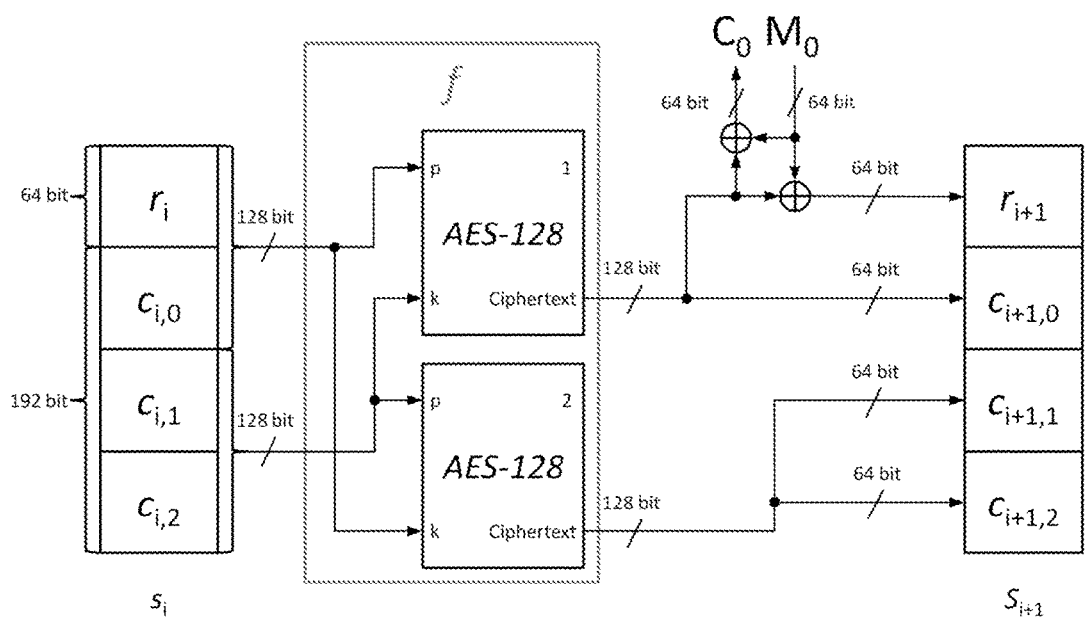
Figure 3:
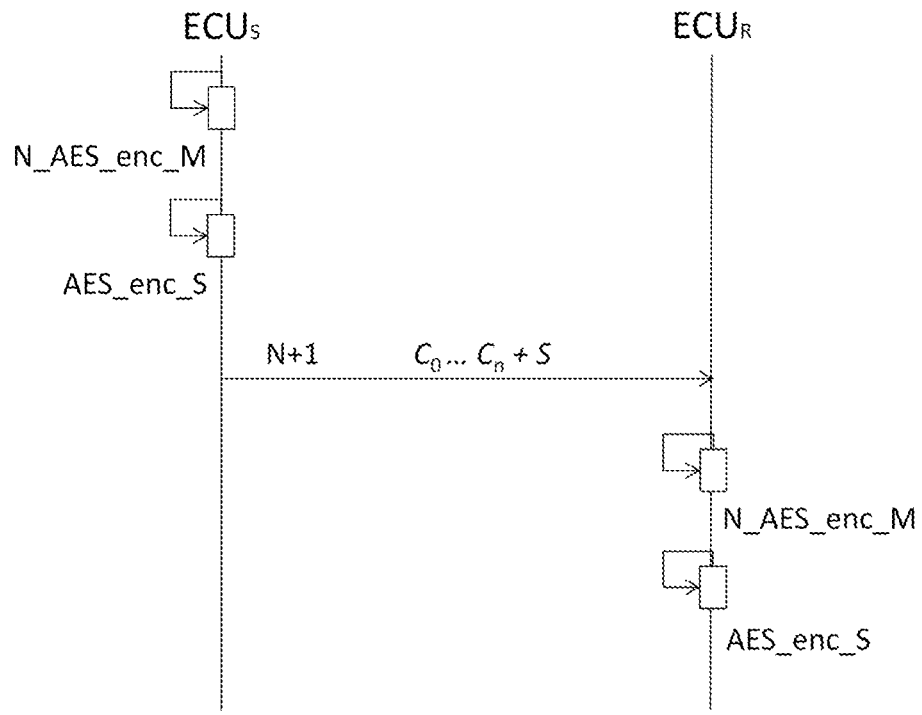
Figure 4:
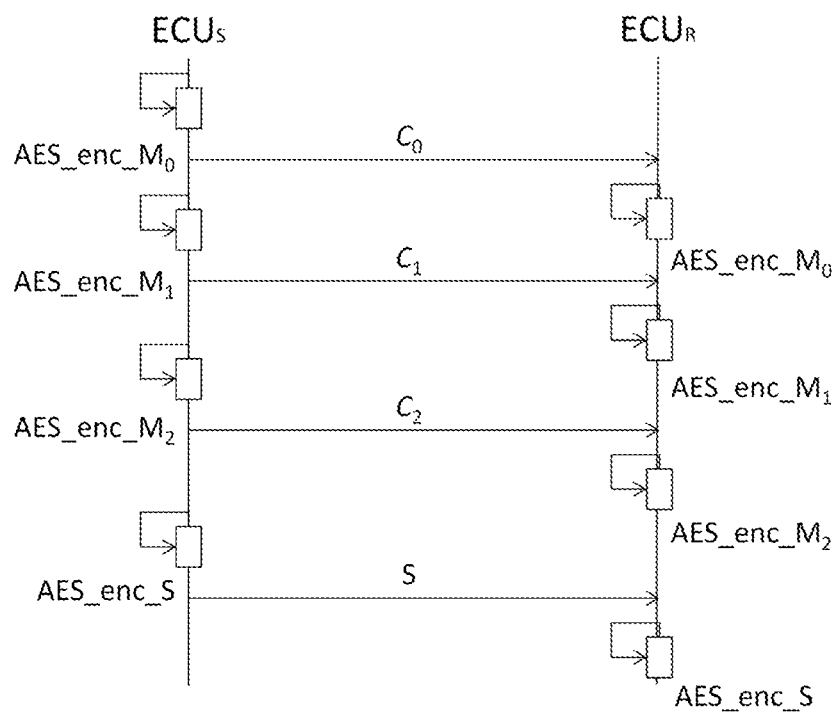

In the figures:

FIG. 1 shows an illustrative embodiment of a sponge construction for encryption and signing according to the invention, FIG. 2 shows an illustrative diagrammatic representation of a sponge function f for mapping an internal initialization state $s_i$ to a following internal state $s_{i+1}$, FIG. 3 shows an illustrative embodiment of the method according to the invention, in which a transmission of the encrypted data blocks $M_0 \ldots M_n$ of one or more databus messages takes place following the encryption of all blocks, and FIG. 4 shows an illustrative embodiment of the method according to the invention, in which an on-the-fly transmission of the encrypted data blocks or cipher blocks $C_0 \ldots C_n$ of one or more data blocks $M_0 \ldots M_n$ is performed following the encryption.

For the encryption of a message to be sent, for example via a databus of a vehicle, a sponge construction shown in FIG. 1, as is known, for example, for a cryptological hash function family SHA-3 (Keccak) is utilized. The message to be encrypted is here initially divided into blocks $M_0 \ldots M_n$ of equal length and the internal initialization state $s_i$ is initialized with a secret key. Sponge function f maps an internal state $s_i \ldots s_{i+n}$ in each case to a following state $s_{i+1} \ldots s_{i+n+1}$ and in doing so represents a suitable permutation or transformation. The states $s_i \ldots s_{i+n+1}$ are here divided in each case into a part $r_i$, called rate, and a part $C_i$ which is called capacity. According to the invention, the measures represented with dashed arrows are used for block-by-block encryption and signature generation, wherein during a transition from an internal state $s_i \ldots s_{i+n}$ to a following internal state $s_i \ldots s_{i+n+1}$ the data blocks $M_0 \ldots M_n$ are in each case accommodated by means of Exclusive-OR logic $\oplus$ and output as encrypted cipher blocks $C_0 \ldots C_n$. For forming a cipher block $C_0 \ldots C_n$, a respective data block $M_0 \ldots M_n$ is combined with a rate formed by a respective permutation function $r_{i+1} \ldots r_{i+n}$ by means of Exclusive-OR $\oplus$. Following the phase of encryption of the data blocks $M_0 \ldots M_n$ and generation of cipher blocks $C_0 \ldots C_n$, signature S is output. The cipher blocks $C_0 \ldots C_n$ thus correspond to the rate $r_{i+1} \ldots r_{i+n}$ of the state following in each case, which is why the calculated rate $r_{i+1} \ldots r_{i+n}$ can also be output alternatively as cipher block $C_0 \ldots C_n$ after accommodation of the respective data block $M_0 \ldots M_n$, particularly for avoiding the execution of a number of Exclusive-OR combinations during a transition.

This general principle can be applied for a databus of a vehicle, for example a CAN bus or BroadR-Reach, in that fixed bit sizes and a concrete sponge function f are selected.

FIG. 2 shows on the example of the transition from initialization state $s_i = r_i \| C_i$ to state $s_{i+1} = r_{i+1} \| C_{i+1}$ illustrative parameter values and sponge function f which is formed by the AES networks (Advanced Encryption Standard) 1 and 2. As already described, initialization state $s_i$ is initialized with a common secret 256-bit key of the communicating bus users, 128-bits in each case being supplied to the inputs P of the AES networks 1 and 2 and the other 128 bits in each case being used as key K. Correspondingly, the first 128 bits are encrypted with the last 128 bits of state $s_i$ and conversely. The AES networks 1 and 2 in each case output 128-bit-encrypted data cipher text. The first 64 bits of an initialization key encrypted in this way are output as cipher block $C_0$ by including data block $M_0$ by means of Exclusive-OR logic and provided as rate $r_{i+1}$ for state $s_{i+1}$. The further 192 bits output are used as capacities $C_{i+1,0} \ldots C_{i+1,2}$ for state $s_{i+1}$.

The sizes of the data blocks $M_0 \ldots M_n$ are chosen in accordance with this illustrative embodiment in such a way that in each case the payload data of an individual CAN message (=8 bytes=64 bits) can be encrypted. A CAN message is thus identical to the block size of a data block $M_0 \ldots M_n$. Instead of the unencrypted CAN messages, the encrypted cipher blocks $C_0 \ldots C_n$ are thus transmitted by means of CAN bus. Alternatively, a CAN message length represents a multiple of the size of a data block $M_0 \ldots M_n$. Additionally, padding data can also be provided for all embodiments. In order to transmit signature S, at least one further CAN message is preferably additionally transmitted via the databus. Alternatively to the AES-128 operations, other functions or encryption algorithms can be utilized. Furthermore, other parameters can be used, for example for the rate r, capacity c and key size.

The transmission of the cipher blocks $C_0 \ldots C_n$ from a transmitting bus user $ECU_s$ to a receiving bus user $ECU_R$ can take place after complete encryption and formation of signature S as shown for the exemplary embodiment of FIG. 3, or also on-the-fly as shown for the exemplary embodiment of FIG. 4. By the latter method, in particular, short latency periods are ensured.

In accordance with the illustrative embodiment of FIG. 1, a transmission of cipher blocks $C_0 \ldots C_n$ of one or more messages occurs following the encryption of all blocks N_AES_enc_M and the formation of the associated signature AES_enc_S, and the signature S can be created jointly for these several messages in the case of a number of CAN messages. This is preferably implemented by means of a dedicated memory. For example, N 8-byte CAN messages are encrypted and an associated 8-byte signature S of this is created. Following this, N+1 CAN messages are transmitted (N cipher blocks+signature S) via the CAN databus to $ECU_R$. $ECU_R$ deciphers the messages N_AES_enc by carrying out the identical operation and verifies the integrity and authenticity AES_enc_S of the received messages by means of signature S.

In accordance with the illustrative embodiment of FIG. 4, an on-the-fly encryption AES_enc_$M_0$ . . . AES_enc_$M_2$ of CAN messages and directly following transmission of the respective encrypted CAN message or of the data block, respectively, is carried out, wherein signature S is generated AES_enc_S and also transmitted following thereafter. Receiver $ECU_R$ efficiently sequentially decrypts (AES_enc_$M_0$ . . . AES_enc_$M_2$) ff already the received CAN messages, a verification AES_enc_S taking place following the reception of the signature S.

The invention claimed is:

1. A method for preserving information security of data transmitted by a databus, comprising:
   generating cipher blocks by dividing the data to be transmitted via the databus from a transmitter to at least one receiver into data blocks before being transmitted, wherein the data blocks are at least one of encrypted and signed, block by block, using a sponge construction that forms a cryptological hash function, utilizing a key, and transmitting the generated cipher blocks via the databus to the at least one receiver, and
   wherein an internal state of the sponge construction has a rate and a capacity, wherein a content of a cipher block is utilized as the rate of a respectively following internal state of the sponge construction.

2. The method as claimed in claim 1, wherein the block-by-block encryption of the data blocks and block-by-block generation of the cipher blocks takes place during a phase of inclusion of the data blocks.

3. The method as claimed in claim 1, wherein, following the encryption of the data blocks and generation of the cipher blocks, a signature is generated using the sponge construction on the basis of the data blocks to be transmitted and of the key and is transmitted via the databus.

4. The method as claimed in claim 1, wherein an initialization state of the sponge construction is initialized with the key.

5. The method as claimed in claim 1, wherein a cipher block is determined from a rate of an internal state using a data block.

6. The method as claimed in claim 5, wherein the sponge construction has at least one sponge function which maps an internal state onto a following internal state, the sponge function being formed by using at least one substitution permutation network.

7. The method as claimed in claim 6, wherein the substitution permutation network is implemented by a block-cipher.

8. The method as claimed in claim 7, wherein the block-cipher is Advanced Encryption Standard.

9. The method as claimed in claim 5, wherein a first part of an internal state of a sponge function is supplied as data to be encrypted and a second part of the internal state of the sponge function is supplied as key.

10. The method as claimed in claim 9, wherein a second part of an internal state of the sponge construction is supplied to a substitution permutation network of the sponge function as data to be encrypted and the first part of the internal state is supplied to the substitution permutation network as key.

11. The method as claimed in claim 1, wherein a cipher block is determined by utilizing a data block from a rate obtained from the key or a rate calculated using a sponge function, using Exclusive-OR logic.

12. The method as claimed in claim 1, wherein the transmission of the cipher blocks via the databus occurs following the encryption of all data blocks and formation of the signature or block-by-block in each case following the encryption of an individual data block.

13. The method as claimed in claim 1, wherein the length of a data block corresponds to the length of a data frame or to the length of the payload data of a data frame of a basic databus protocol of the databus or the length of a data frame of a databus protocol of the databus corresponds to a multiple of the length of a data block.

14. A databus system for preserving information security of data transmitted by a databus, comprising:
  a transmitter,
  at least one receiver,
  and at least one communication means for communication between the transmitter and the at least one receiver,
  the databus system configured to:
  generate cipher blocks by dividing the data to be transmitted via the databus from the transmitter to the at least one receiver into data blocks before being transmitted, wherein the data blocks are at least one of encrypted and signed, block by block, using a sponge construction that forms a cryptological hash function, utilizing a key, and transmit the generated cipher blocks via the databus to the at least one receiver, and
  wherein an internal state of the sponge construction has a rate and a capacity, wherein a content of a cipher block is utilized as the rate of a respectively following internal state of the sponge construction.

15. The system as claimed in claim 14, wherein the block-by-block encryption of the data blocks and block-by-block generation of the cipher blocks takes place during a phase of the inclusion of the data blocks.

16. The system as claimed in claim 14, wherein, following the encryption of the data blocks and generation of the cipher blocks, a signature is generated using the sponge construction on the basis of the data blocks to be transmitted and of the key and is transmitted via the databus.

17. The system as claimed in claim 14, wherein an initialization state of the sponge construction is initialized with the key.

18. The system as claimed in claim 14, wherein a cipher block is determined from a rate of an internal state using a data block.

19. The system as claimed in claim 14, wherein a cipher block is determined by utilizing a data block from a rate obtained from the key or a rate calculated using a sponge function, using Exclusive-OR logic.

* * * * *